United States Patent
Parizy et al.

(10) Patent No.: US 8,681,636 B2
(45) Date of Patent: Mar. 25, 2014

(54) MONITORING APPARATUS, METHOD, AND COMPUTER PRODUCT

(75) Inventors: Matthieu Parizy, Kawasaki (JP); Hiroaki Iwashita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 247 days.

(21) Appl. No.: 12/818,458

(22) Filed: Jun. 18, 2010

(65) Prior Publication Data

US 2011/0205903 A1    Aug. 25, 2011

(30) Foreign Application Priority Data

Feb. 23, 2010  (JP) ................................. 2010-038007

(51) Int. Cl.
*G01R 31/08*     (2006.01)
*H04L 1/00*      (2006.01)

(52) U.S. Cl.
USPC ........... 370/241; 370/394; 370/351; 370/252; 370/231; 709/224; 709/203; 709/232

(58) Field of Classification Search
USPC ......... 370/241, 394, 351, 352, 253, 465, 252, 370/400, 231, 229, 235, 392, 389; 709/224, 709/232, 203, 242, 235, 206
See application file for complete search history.

(56) References Cited

U.S. PATENT DOCUMENTS

| | | | | |
|---|---|---|---|---|
| 7,417,991 B1 * | 8/2008 | Crawford et al. | ............. | 370/394 |
| 7,603,418 B1 * | 10/2009 | Xu | ................ | 709/206 |
| 7,990,861 B1 * | 8/2011 | Jin et al. | ........................ | 370/231 |
| 2005/0033990 A1 * | 2/2005 | Harvey et al. | ................ | 713/201 |
| 2007/0019564 A1 * | 1/2007 | Park | ............................. | 370/252 |
| 2009/0262743 A1 * | 10/2009 | Uyehara et al. | ................ | 370/394 |
| 2011/0026410 A1 * | 2/2011 | Meloche | ....................... | 370/244 |

FOREIGN PATENT DOCUMENTS

| | | |
|---|---|---|
| JP | 2005-519530 | 6/2005 |
| JP | 2005-318006 | 11/2005 |
| JP | 2009-021808 | 1/2009 |
| WO | 03/075520 | 9/2003 |

OTHER PUBLICATIONS

Japanese Office Action mailed Sep. 10, 2013 in Japanese Application No. 2010-038007.

* cited by examiner

*Primary Examiner* — Charles C Jiang
*Assistant Examiner* — Jamal Javaid
(74) *Attorney, Agent, or Firm* — Staas & Halsey LLP

(57) ABSTRACT

A non-transitory computer-readable recording medium stores therein a monitoring program that causes a computer monitoring data transmission from a transmission source device to a transmission destination device to execute a process that includes detecting data transmitted in a sequence that differs from a specified sequence; determining whether the sequence that differs is permissible by a specified constraint, if data transmitted at the sequence that differs is detected at the detecting; and outputting a determination result obtained at the determining.

3 Claims, 13 Drawing Sheets skip_off(packet)=built_in(packet)∨plugin_1(packet)∨plugin_3(packet)

MONITORING APPARATUS, METHOD, AND COMPUTER PRODUCT

CROSS REFERENCE TO RELATED APPLICATIONS

This application is based upon and claims the benefit of priority of the prior Japanese Patent Application No. 2010-038007, filed on Feb. 23, 2010, the entire contents of which are incorporated herein by reference.

FIELD

The embodiment discussed herein is related to data transmission monitoring.

BACKGROUND

Conventionally, under arbitrary processing, when a series of data (transaction) is transmitted from a transmission source device to a transmission destination device, the transaction is divided into packets and transmitted (refer to Japanese Laid-Open Patent Publication No. 2005-519530). If there are multiple transactions, packets belonging to each transaction are transmitted in a specified sequence. For example, for given transactions A and B, the specified sequence may be an alternating transmission of 1 packet of transaction A and 1 packet of transaction B.

There are occasions when packets are transmitted in a sequence that differs from the specified sequence. In the example of transactions A and B, a differing sequence may be the skipping of a packet of transaction A and successive transmission of packets of transaction B. In a similar way, conversely, a packet of transaction B may be skipped and packets of transaction A may be successively transmitted.

Causes of packet skipping include errors that occur when the operation of the transmission source device is faulty (first cause) and occasions determined by communication protocol, design specifications related to the transmission source device, etc. (second cause). Communication protocol is a set of standard rules related to communication over a network. Although verification engineers are interested in verifying only the first cause, for packets transmitted by a transmission source device, the first and the second causes exist.

Accordingly, after understanding communication protocol and design specifications and determining whether the cause of a skip is the first cause or the second cause, a verification engineer verifies the transmission source device for a packet skipped as a consequence of the first cause. Nonetheless, a problem arises in that if the communication protocol, design specifications, etc. are complicated, the user may misjudge the cause of the skip.

SUMMARY

According to an aspect of an embodiment, a non-transitory computer-readable recording medium stores therein a monitoring program that causes a computer monitoring data transmission from a transmission source device to a transmission destination device to execute a process that includes detecting data transmitted in a sequence that differs from a specified sequence; determining whether the sequence that differs is permissible by a specified constraint, if data transmitted at the sequence that differs is detected at the detecting; and outputting a determination result obtained at the determining.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of the present invention will be explained with reference to the accompanying drawings.

Figure 1:
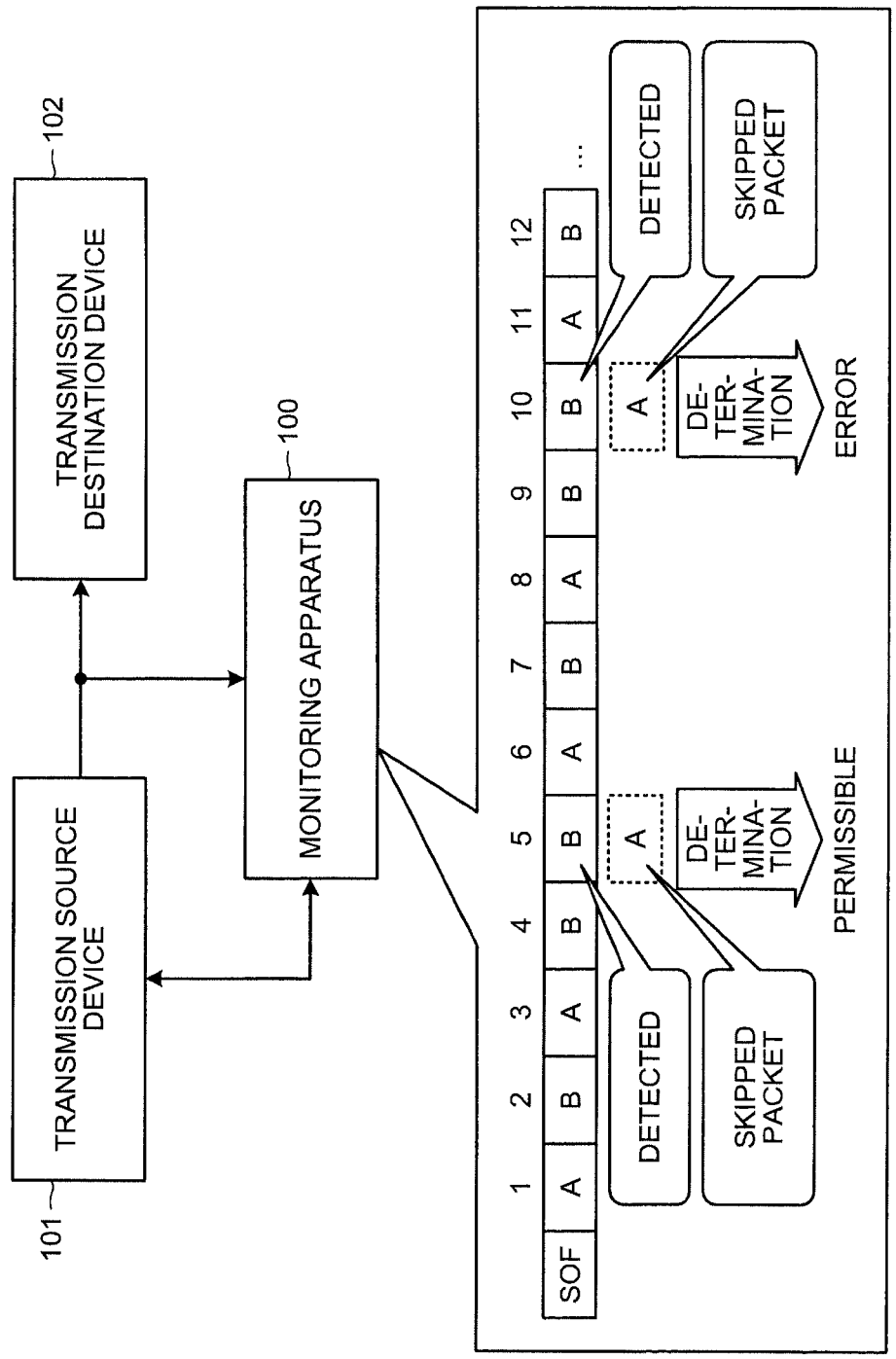
FIG. 1 is a diagram of one example of the present invention.

FIG. 1 is a diagram of one example of the present invention. A transmission source device 101 transmits packets to a transmission destination device 102 and the transmitted packets are monitored by a monitoring apparatus 100. For ease in understanding, in FIG. 1, all of the transmitted packets are enumerated. In the present embodiment, description is given using a universal serial bus (USB) host controller as an example of the transmission source device 101 and using a USB device as the transmission destination device 102. A USB controller, as conventionally known, manages time in units of frames and controls packet transmission.

Further, to indicate the beginning of a frame, the USB host controller issues a Start Of Frame (SOF) to a bus connecting the USB host controller and the USB device.

Solid-lined boxes □ having an "A" represent packets of transaction A and solid-lined boxes □ having a "B" represent packets of transaction B. Since each of the packets has identification information (transaction identification (ID)) enabling identification of the transaction to which the packet belongs, the monitoring apparatus 100 identifies the transaction to which a packet belongs by the transaction ID. Numerals above the solid-lined boxes □ indicate the sequence in which each packet of 1 frame is transmitted. The specified sequence in FIG. 1 is an alternating transmission of 1 packet of transaction A and 1 packet of transaction B.

Firstly, SOF is transmitted from the transmission source device 101 to the transmission destination device 102 and subsequently, a packet of transaction A is transmitted first and a packet of transaction B is transmitted second. A packet of transaction A is transmitted third, and a packet of transaction B is transmitted fourth. Next, although a packet of transaction A is to be transmitted fifth according to the specified sequence, in FIG. 1, a packet of transaction B is transmitted fifth. Thus, a packet of transaction A is skipped (dotted-lined □).

The monitoring apparatus 100 detects the packet of transaction B transmitted fifth, to be a packet that has been transmitted in a sequence differing from the specified sequence. The monitoring apparatus 100, upon detecting the packet transmitted in a differing sequence, determines whether the differing sequence is permissible by a specified constraint. A specified constraint is a constraint of a user specified communication protocol, a constraint related to design specifications, and the like.

A constraint based on communication protocol restricts the transmission of a packet, e.g., if a packet cannot be sent entirely within a given time period, the packet is not transmitted. A design specification based constraint is a user specified constraint that is based on design specifications. Details concerning constraints related to communication protocol constraints and design specification constraints are described hereinafter. Expression (1) below is a conditional expression related to constraints.

$$\text{skip\_ok (packet)} = \text{built\_in (packet)} \qquad (1)$$
$$\vee \text{ plugin\_1 (packet)}$$
$$\vee \text{ plugin\_2 (packet)}$$
$$\vee \text{ plugin\_3 (packet)}$$
$$\vdots$$
$$\vee \text{ plugin\_N (packet)}$$

Here, in expression (1) above, built_in(packet) is a constraint based on communication protocol, plugin_1 (packet) to plugin_N(packet) are N constraints based on design specifications. ∨ represents logical OR. If any one of the constraints in expression (1) is 1 (true), skip_ok (packet) is 1 (true), indicating that skipping is permissible. Additional design specification based constraints may be added to expression (1) as plug-ins respectively connected by ∨.

Expression (1) may be created by the user or may be created by the monitoring apparatus 100, based on design specification based constraints and communication protocol based constraints.

Next, the fifth packet is a packet of transaction B and the skipped packet is a packet of transaction A. The monitoring apparatus 100 obtains skip_ok (packet of transaction A) (hereinafter, "skip_ok(A)"), and if skip_ok(A) is 1, determines that the differing sequence is permissible by a specified constraint. Here, skip_ok(A) is assumed to be 1 and the monitoring apparatus 100, for example, outputs information indicating that concerning the fifth transmission, the skipping of the packet of transaction A is permissible.

Subsequently, a packet of transaction A is transmitted eighth, a packet of transaction B is transmitted ninth, and a packet of transaction B is also transmitted tenth. The monitoring apparatus 100 detects the packet of transaction B transmitted tenth, to be a packet that has been transmitted in a sequence differing from the specified sequence. Thus, a packet (of transaction A), which should have been transmitted tenth, has been skipped (dotted-lined □).

Next, the monitoring apparatus 100 obtains skip_ok(A). Here, skip_ok(A) is assumed to be 0 (false). The monitoring apparatus 100 determines that for the tenth packet, the differing sequence is not permissible by a specified constraint and outputs information indicating that for the packet transmitted tenth, a packet of transaction A has been skipped in error.

Figure 2:
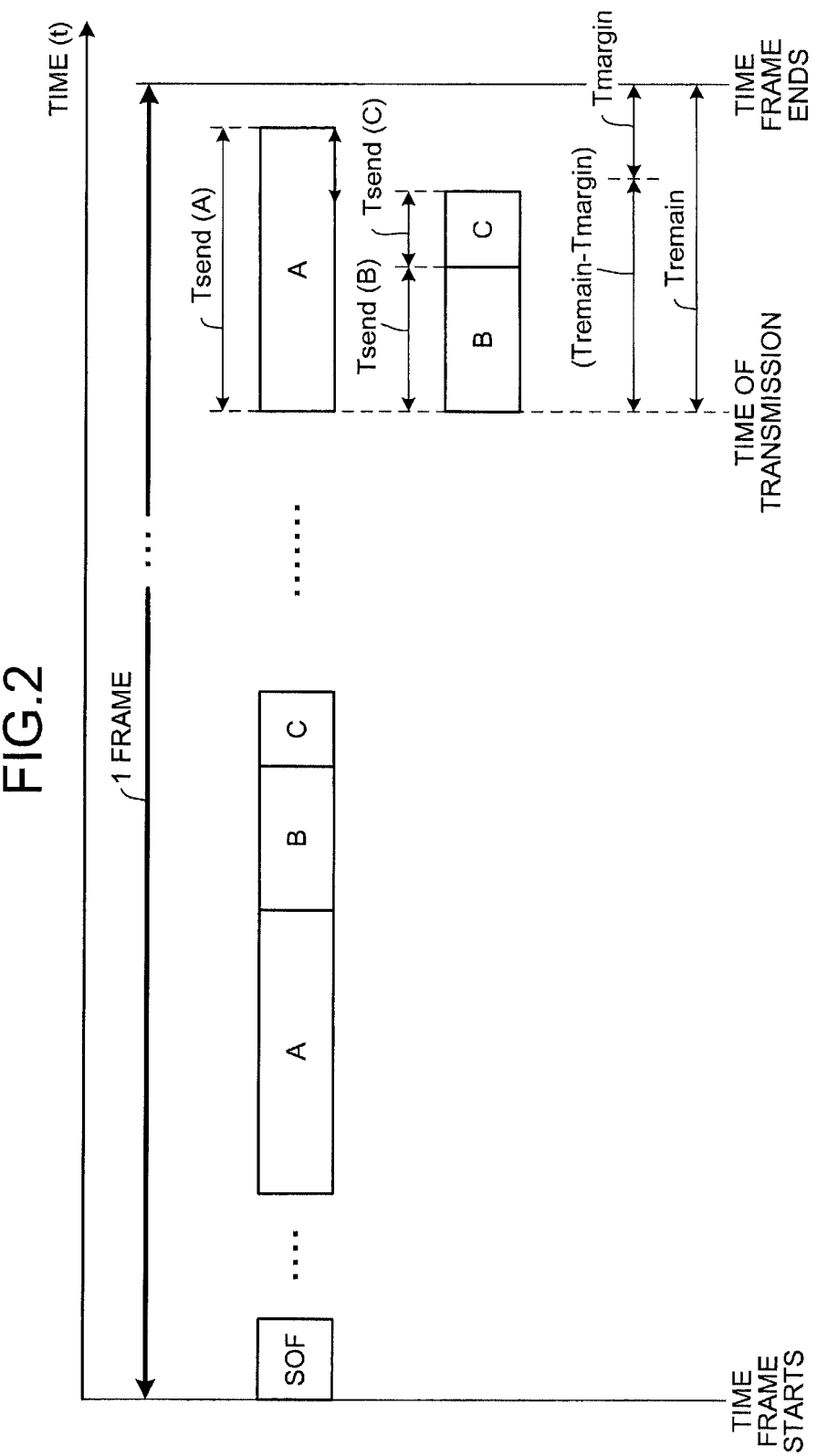
FIG. 2 is a diagram of an example of a communication protocol based constraint.

FIG. 2 is a diagram of an example of a communication protocol based constraint. Tremain is a period of time from the time of transmission until the time that the frame ends. Tmargin is a user specified period of time immediately before the time that a frame ends and during which a packet cannot be transmitted. The value of Tmargin is determined through user variation and adjustment.

Tsend(packet) represents transmission time of a packet, e.g., Tsend(A) is the transmission time for a packet of transaction A. Since data volume differs according to transaction, the transmission time of a packet differs according to transaction. "built_in(packet)" of expression (1) is expressed by expression (2) below.

$$\text{built\_in(packet)} = (T\text{remain} - T\text{margin} < T\text{send(packet)}) \qquad (2)$$

Here, in expression (2) above, if (Tremain-Tmargin) is less than Tsend(packet), built_in(packet) is 1 (true) and if (Tremain-Tmargin) is equal to or greater than Tsend(packet), built_in(packet) is 0 (false). A value of 1 (true) for built_in(packet) indicates that a packet has been skipped due to insufficient time for transmitting the packet. On the contrary, a value of 0 (false) for built_in(packet) indicates that time for transmitting the packet was sufficient.

For example, at the time of transmission, if a skipped packet is a packet of transaction A, in FIG. 1, (Tremain-Tmargin) is smaller than Tsend(A) and hence, expression (2) is 1 (true). Therefore, it is determined that the skipping of the packet is permissible. On the other hand, for example, at the time of transmission, if the skipped packet is a packet of transaction B or a packet of transaction C, in FIG. 2, (Tremain-Tmargin) is equal to or greater than Tsend(B) and Tsend(C), respectively and hence, expression (2) is 0 (false).

Figure 3:
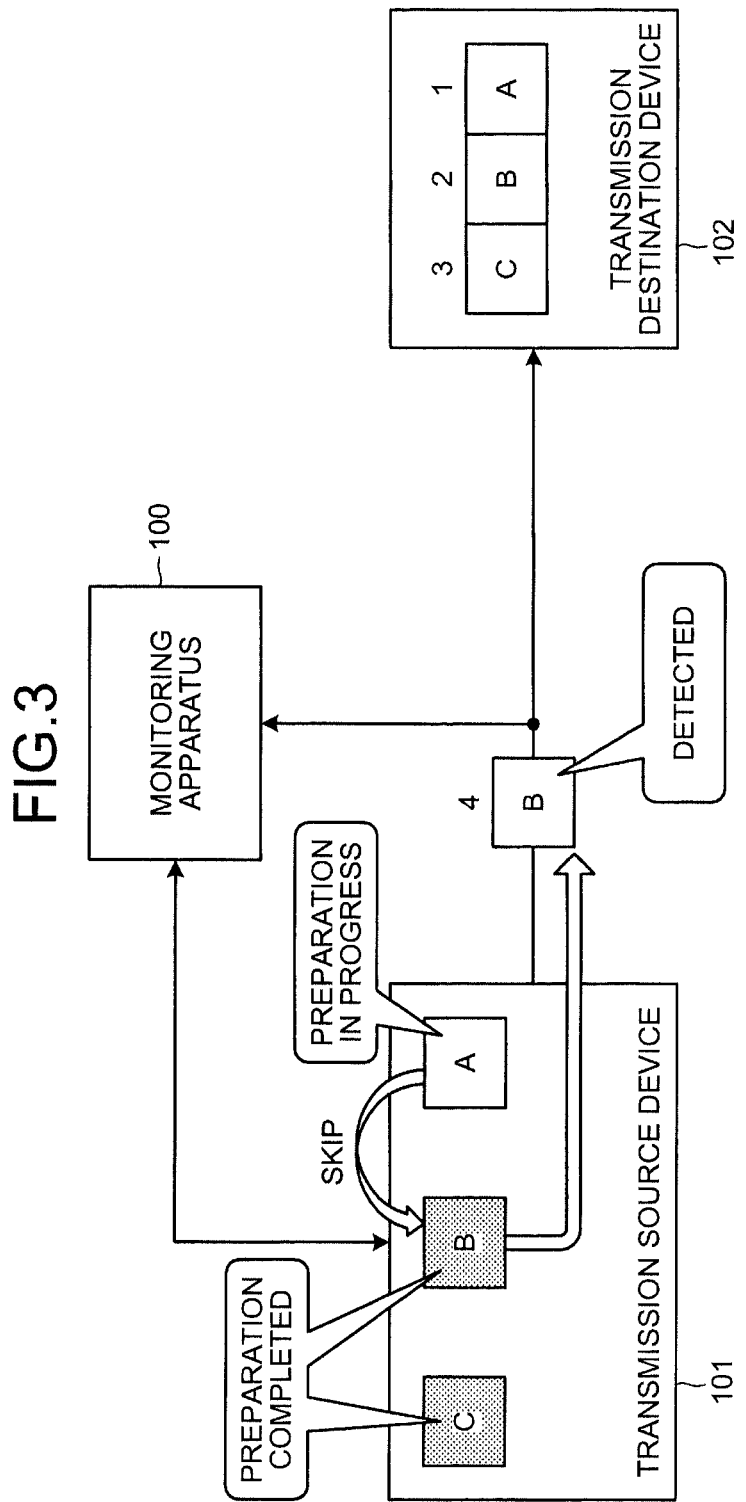
FIG. 3 is a diagram of an example of a constraint based on design specifications related to a transmission source device.

FIG. 3 is a diagram of an example of a constraint based on design specifications related to the transmission source device 101. In the present embodiment, the specified sequence is a sequence of transactions A to C. From the transmission source device 101, a packet of transaction A is transmitted first, a packet of transaction B is transmitted second, and a packet of transaction C is transmitted third. Subsequently, although a packet of transaction A is to be transmitted fourth according to the specified sequence, in FIG. 3, a packet of transaction B is transmitted fourth. Thus, the monitoring apparatus 100 detects the packet of transaction B transmitted fourth to be in a sequence that differs from the specified sequence.

The monitoring apparatus 100 accesses the transmission source device 101 and identifies the state of the skipped packet of transaction A. Here, transaction A is, for example, is a series of data read from a storage apparatus. In FIG. 3, since all of the data has not been read from the storage apparatus, the packet of transaction A is under preparation for transmission. On the other hand, since preparation of a packet of transaction B has been completed, the transmission source device 101 skips the packet of transaction A and transmits the packet of transaction B fourth.

In the present embodiment, plugin_1 (packet) is a constraint related to whether a packet is under preparation for transmission. The monitoring apparatus 100 accesses the transmission source device 101 and acquires information indicating whether the packet of transaction A is under preparation for transmission. If the acquired information indicates that preparation is in progress, the monitoring apparatus 100 regards plugin_1 (packet) to be 1 (true) and if the information indicates preparation for transmission to be completed, regards plugin_1 (packet) to be 0 (false). In the present embodiment, plugin_1 is the only constraint based on design specifications related to the transmission source device 101, and in a conditional expression based on two constraints, a constraint based on design specifications and a constraint based on communication protocol, expression (3) below is used.

$$\text{skip\_ok (packet)} = \text{built\_in (packet)} \quad (3)$$
$$\vee \text{ plugin\_1 (packet)}$$

Figure 4:
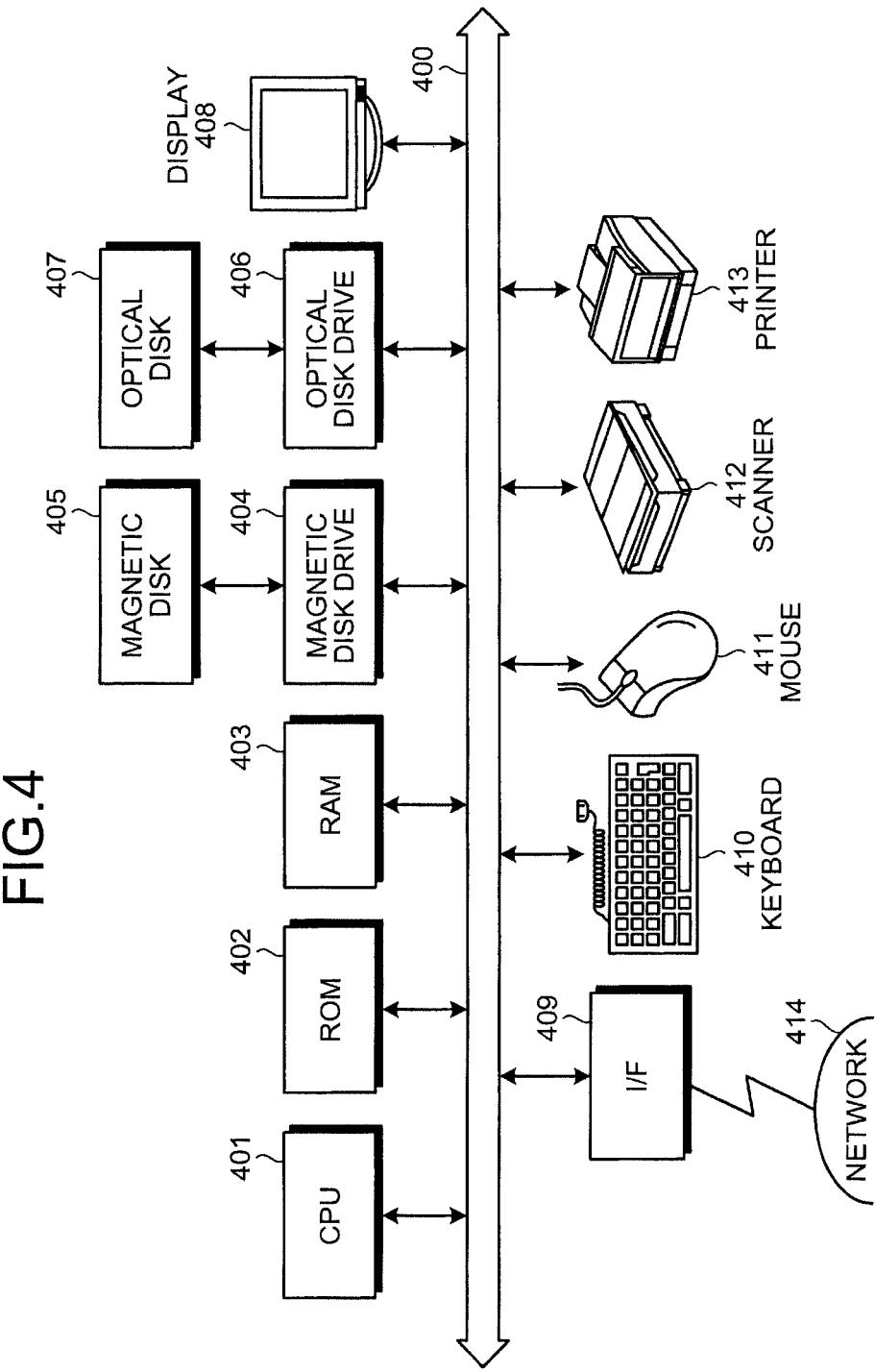
FIG. 4 is a block diagram of a hardware configuration of a monitoring apparatus.

FIG. 4 is a block diagram of a hardware configuration of the monitoring apparatus 100. As depicted in FIG. 4, the monitoring apparatus 100 includes a central processing unit (CPU) 401, a read-only memory (ROM) 402, a random access memory (RAM) 403, a magnetic disk drive 404, a magnetic disk 405, an optical disk drive 406, an optical disk 407, a display 408, an interface (I/F) 409, a keyboard 410, a mouse 411, a scanner 412, and a printer 413, respectively connected through a bus 400.

The CPU 401 governs overall control of the monitoring apparatus 100. The ROM 402 stores therein programs, such as a boot program. The RAM 403 is used as a work area of the CPU 401. The magnetic disk drive 404, under the control of the CPU 401, controls the reading and writing of data with respect to the magnetic disk 405. The magnetic disk 405 stores data written thereto under the control of the magnetic disk drive.

The optical disk drive 406, under the control of the CPU 401, controls the reading and writing of data with respect to the optical disk 407. The optical disk 407 stores data written thereto under the control of the optical disk drive 406, the data being read by a computer.

The display 408 displays, for example, data such as text, images, functional information, etc., in addition to a cursor, icons, or tool boxes. A CRT, a TFT liquid crystal display, a plasma display, etc., may be employed as the display 408.

The interface (I/F) 409 is connected to a network 414 such as a local area network (LAN), a wide area network (WAN), the Internet, etc. through a communication line and is connected to other apparatuses through this network 414. The I/F 409 administers an internal interface with the network 414 and controls the input and output of data with respect to external apparatuses. A modem, a LAN adapter and the like may be adopted as the I/F 409.

The keyboard 410 includes keys for inputting, for example, letters, numerals, and various instructions, and is used for the input of data. A touch-panel-type input pad or numeric keypad, etc. may be adopted. The mouse 411 performs the movement of the cursor, selection of a region, or movement and size change of windows. A track ball or a joy stick may be adopted provided each respectively has a function similar to a pointing device.

The scanner 412 optically reads an image and takes in the image data into the monitoring apparatus 100. The scanner 412 may have an optical character recognition (OCR) function as well. The printer 413 prints image data and text data. The printer 413 may be, for example, a laser printer or an ink jet printer.

Figure 5:
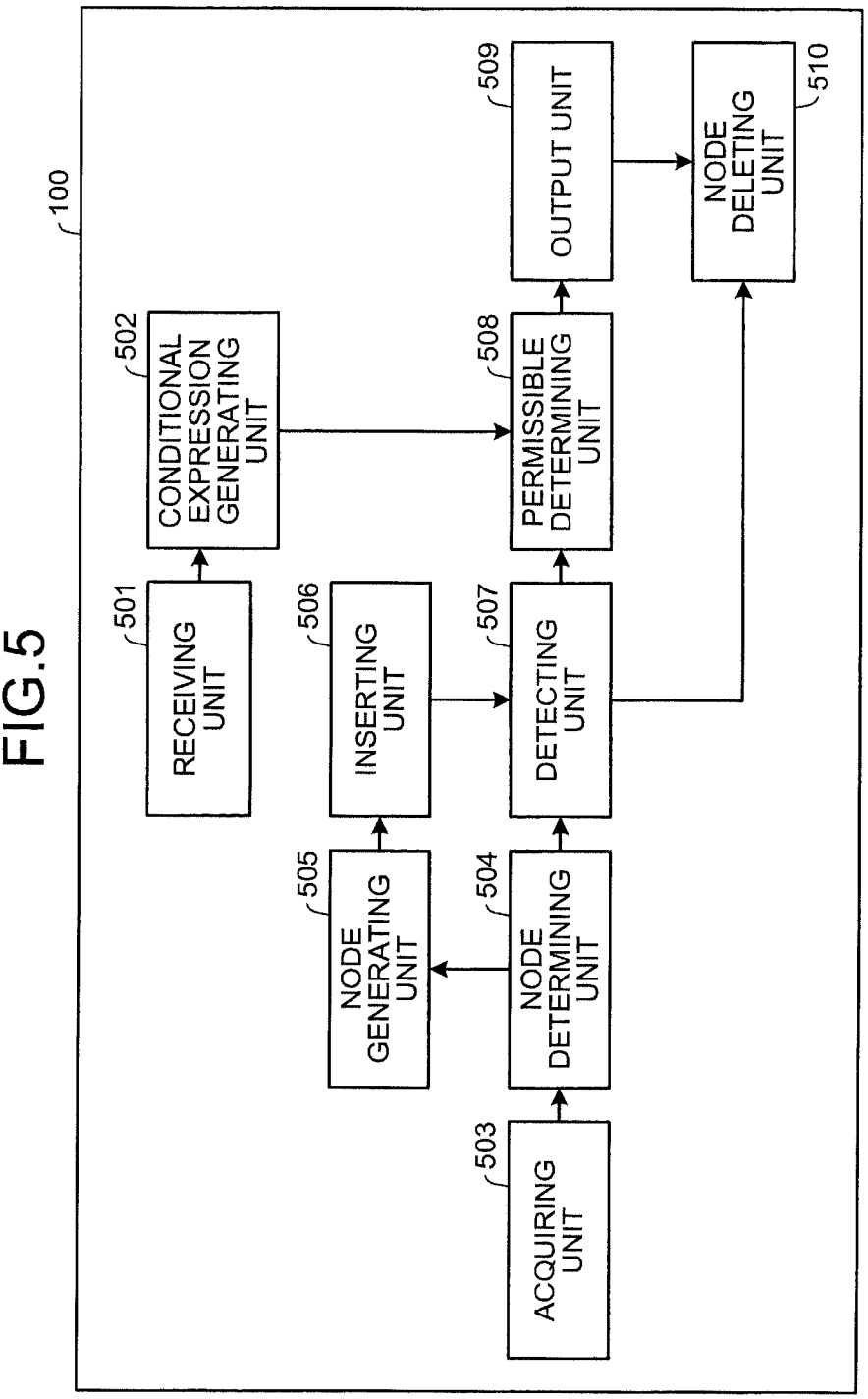
FIG. 5 is a block diagram of a functional configuration of the monitoring apparatus.

FIG. 5 is a block diagram of a functional configuration of the monitoring apparatus 100. The monitoring apparatus 100 includes a receiving unit 501, a conditional expression generating unit 502, an acquiring unit 503, a node determining unit 504, a node generating unit 505, an inserting unit 506, a detecting unit 507, a permissible determining unit 508, an output unit 509, and a node deleting unit 510. Each function (the receiving unit 501 to the node deleting unit 510), for example, is implemented by causing the CPU 401 to execute a program stored in a storage apparatus such as the ROM 402, the RAM 403, the magnetic disk 405, and the optical disk 407 depicted in FIG. 1, or by the I/F 409.

The receiving unit 501 receives input of a constraint(s) selected from among multiple constraints when there are multiple constraints based on design specifications related to the transmission source device 101. The conditional expression generating unit 502 generates a conditional expression related to specified constraints, the specified constraints being the design specification based constraint received by the receiving unit 501 and a communication protocol related constraint.

The acquiring unit 503 acquires a packet transmitted from the transmission source device 101 and the node determining unit 504 determines whether a node corresponding to the transaction ID of the packet acquired by the acquiring unit 503 is on a list. The list is information identifying the transmission sequence of packets and includes nodes corresponding to transaction IDs, where nodes are automatically generated/deleted simultaneously with packet transmission. Details of the list are described hereinafter.

The node generating unit 505 generates a node corresponding to the transaction ID of the acquired packet, if the node determining unit 504 determines that no node corresponding to the transaction ID of the acquired packet is on the list. The inserting unit 506 inserts the node generated by the node generating unit 505 onto the list.

Further, the detecting unit 507 detects the acquired packet as a packet that has been transmitted in a sequence that differs from the specified sequence, if the packet acquired by the acquiring unit 503 is transmitted in a sequence that differs from the specified sequence. If the detecting unit 507 detects a packet that has been transmitted in a sequence that differs, the permissible determining unit 508, based on the conditional expression generated by the conditional expression generating unit 502, determines whether the sequence that differs from the specified sequence is permissible.

The output unit 509 outputs a determination result obtained by the permissible determining unit 508. Subsequently, the node deleting unit 510 deletes the node corresponding to the transaction if the acquired packet is the last packet of a transaction.

Based on the foregoing, the acquiring unit 503 to the node deleting unit 510 will be described in detail with reference to the drawings.

Figure 6:
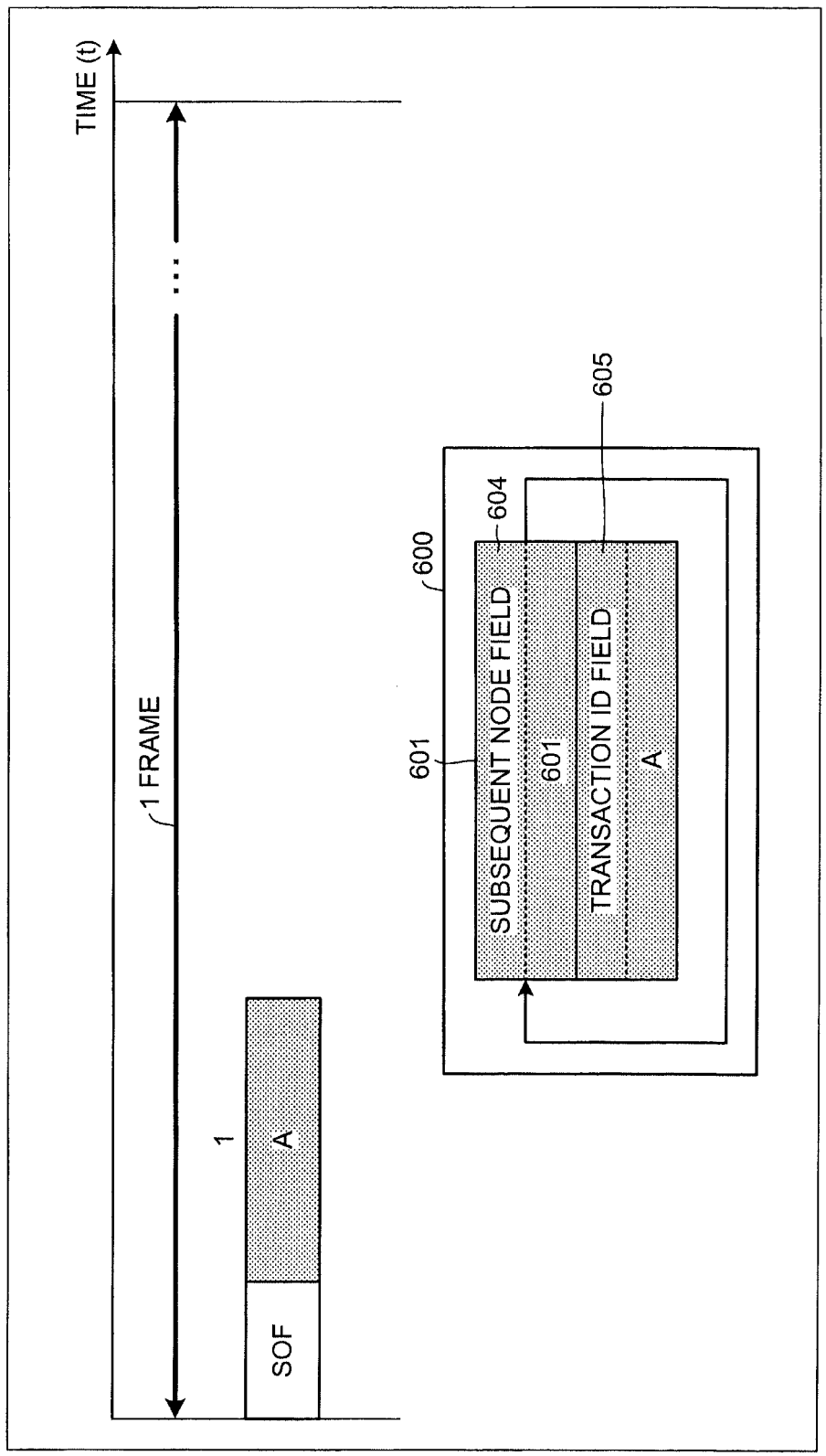
FIG. 6 is a diagram depicting an example of generation of a node corresponding to transaction A.

FIG. 6 is a diagram depicting an example of generation of a node corresponding to transaction A. In FIG. 6, SOF is transmitted from the transmission source device 101 and next when a packet of transaction A is transmitted, the CPU 401, for example, acquires the packet of transaction A. Since a list 600 is empty, the CPU 401 generates a node 601 corresponding to transaction A and inserts the node 601 into the list 600. The list 600 includes only the node 601 corresponding to transaction A.

Here, the list 600 has a list structure and is information indicative of a transmission sequence of packets. Each node includes a subsequent node field 604 and a transaction ID field 605. In the transaction ID field 605 of each node, a transaction ID is stored. The transaction to which a node corresponds can be determined from the transaction ID stored in the transaction ID field 605 (hereinafter, "the transaction ID in the transaction ID field 605").

In FIG. 6, transaction A is indicated by simply A. In the list 600, since the subsequent node field 604 of the node 601 indicates the node 601, if packets are transmitted according to the specified sequence, a packet of transaction A is transmitted after a packet of transaction A. Here, the CPU 401, for example, sets the node 601 as the current node in the list 600.

Figure 7:
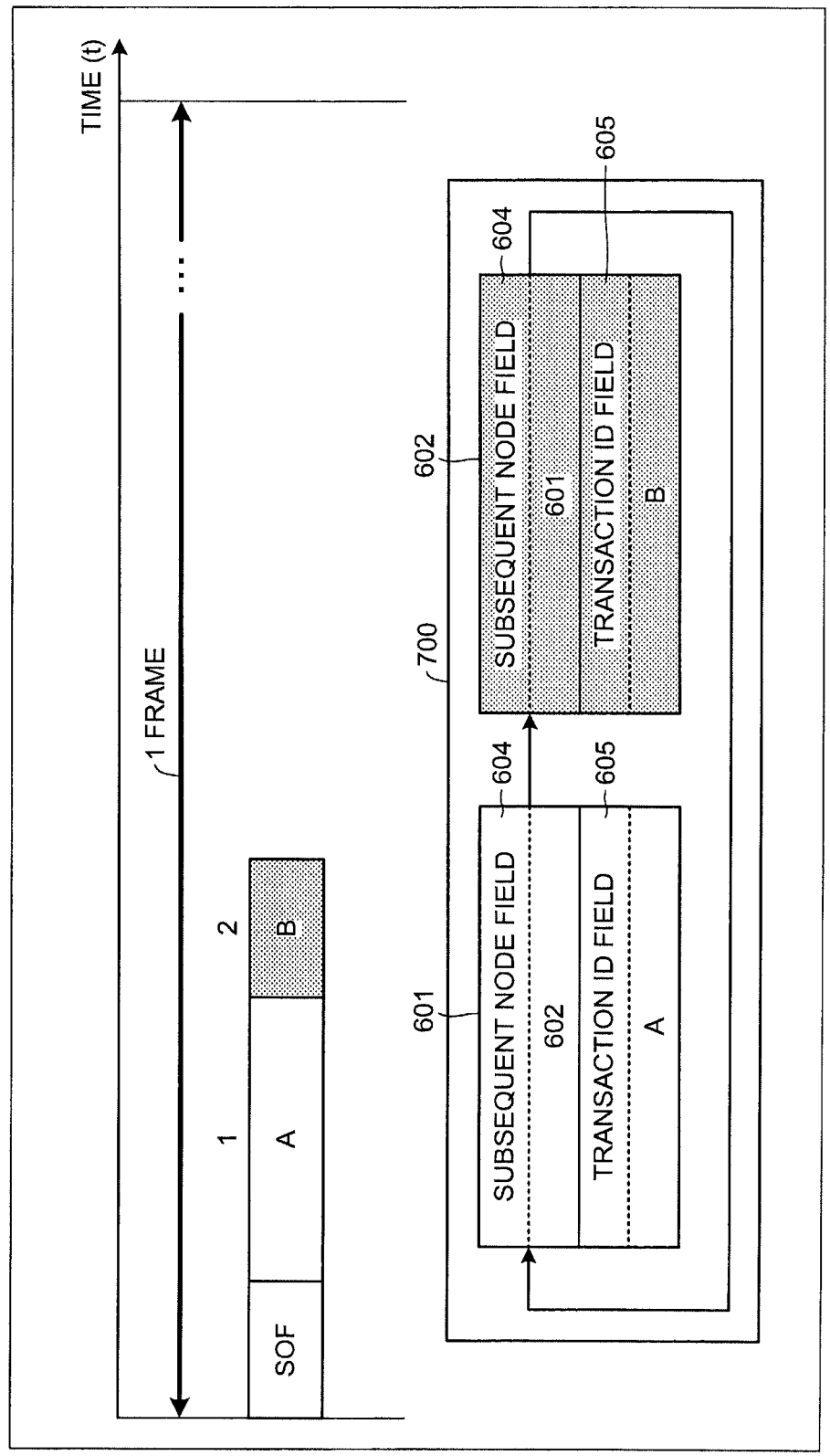
FIG. 7 is a diagram depicting an example of generation of a node corresponding to transaction B.

FIG. 7 is a diagram depicting an example of generation of a node corresponding to transaction B. In FIG. 7, when a packet of transaction B is transmitted from the transmission source device 101, the CPU 401 acquires the packet of transaction B and from the list 600, determines whether there is a node corresponding to transaction B. Since the list 600 includes only the node 601 corresponding to transaction A, it is determined that there is no node corresponding to transaction B.

The CPU 401, for example, generates a node 602 corresponding to transaction B. The CPU 401 inserts the generated node 602 into the subsequent node field 604 of the current node in the list 600. In a list 700, the node 602 is inserted to follow the node 601 (the current node) in the list. In the list 700, since the subsequent node field 604 of the node 601 indicates the node 602, if packets are transmitted according to the specified sequence, a packet of transaction B is transmitted after a packet of transaction A. Further, in the list 700, since the subsequent node field 604 of the node 602 indicates the node 601, if packets are transmitted according to the specified sequence, a packet of transaction A is transmitted after a packet of transaction B.

The CPU 401, for example, determines whether the transaction ID in the transaction ID field 605 of the node indicated by the subsequent node field 604 of the current node and the transaction ID of the acquired packet are identical. If the transaction ID in the transaction ID field 605 of the node indicated by the subsequent node field 604 of the current node and the transaction ID of the acquired packet are identical, it is determined that the packet has been transmitted according to the specified sequence. On the other hand, if the transaction ID of the node indicated by the subsequent node field 604 of the current node and the transaction ID of the acquired packet are not identical, it is determined that the packet has been transmitted in a sequence that differs from the specified sequence.

Here, the current node is the node 601, the subsequent node field 604 of the current node indicates the node 602, and the transaction ID in the transaction ID field 605 of the node 602 is transaction B. Therefore, the CPU 401, for example, determines that the transaction ID in the transaction ID field 605 of the node indicated by the subsequent node field 604 of the current node and the transaction ID of the acquired packet are identical and that the packet transmitted second is according to the specified sequence. Subsequently, the CPU 401 sets the node indicated by the subsequent node field 604 of the current node as the current node in the list 700. Here, the current node becomes the node 602.

Figure 8:
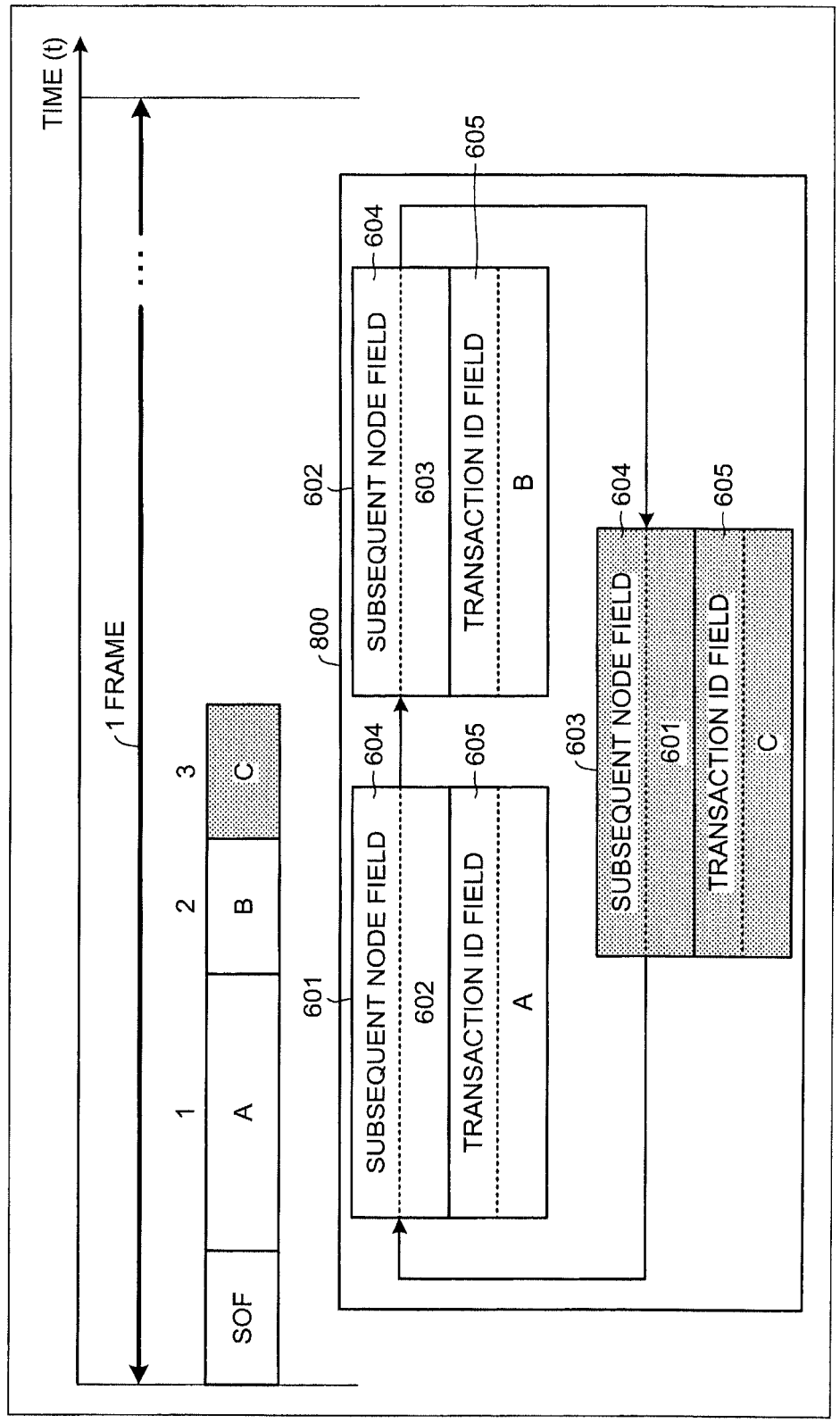
FIG. 8 is a diagram depicting an example of generation of a node corresponding to transaction C.

FIG. 8 is a diagram depicting an example of generation of a node corresponding to transaction C. In FIG. 8, from the transmission source device 101, when a packet of transaction C is transmitted third, the CPU 401 acquires the packet of transaction C and determines from the list 700 whether there is a node corresponding to transaction C. Here, no node corresponding to transaction C is included in the list 700.

The CPU 401, for example, generates a node 603 corresponding to transaction C. Subsequently, the CPU 401, for example, inserts the node 603 into the subsequent node field 604 of the current node in the list 700. In a list 800, the node 603 is inserted to follow the node 602 (the current node) in the list.

In the list 800, since the subsequent node field 604 of the node 601 indicates the node 602, if packets are transmitted according to the specified sequence, a packet of transaction B is transmitted after a packet of transaction A. Further, in the list 800, since the subsequent node field 604 of the node 602 indicates the node 603, if packets are transmitted in the specified sequence, a packet of transaction C is transmitted after a packet of transaction B. Furthermore, in the list 800, since the subsequent node field 604 of the node 603 indicates the node 601, if packets are transmitted according to the specified sequence, a packet of transaction A is transmitted after a packet of transaction C.

The CPU 401, for example, determines whether the transaction ID in the transaction ID field 605 of the node indicated by the subsequent node field 604 of the current node and the transaction ID of the acquired packet are identical. Here, the current node is the node 602 and the subsequent node field 604 of the current node indicates the node 603. Therefore, the transaction ID in the transaction ID field 605 of the node 603 is transaction C.

The CPU 401, for example, determines that the transaction ID in the transaction ID field 605 of the node indicated by the subsequent node field 604 of the current node and the transaction ID of the acquired packet are identical and that a packet has been transmitted third according to the specified sequence. Subsequently, the CPU 401 sets the node indicated by the subsequent node field 604 of the current node as the current node, the current node becoming the node 603.

Figure 9:
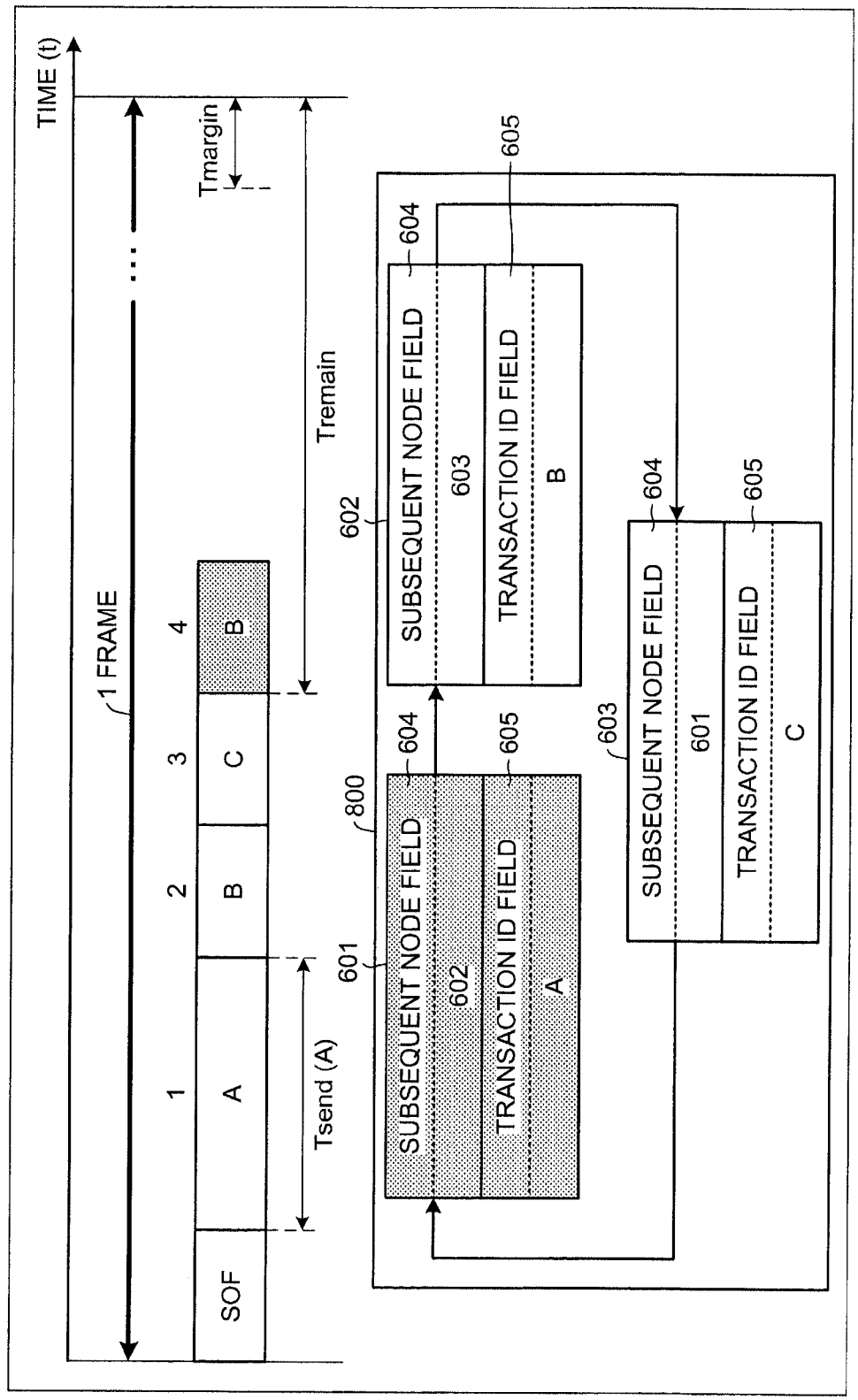
FIG. 9 is a diagram of an example of packet transmission in a sequence that differs from a specified sequence.

FIG. 9 is a diagram of an example of packet transmission in a sequence that differs from the specified sequence. In FIG. 9, from the transmission source device 101, when a packet of transaction B is transmitted fourth, the CPU 401 acquires the packet of transaction B and from the list 800, determines whether there is a node corresponding to transaction B. Since in the list 800, the transaction ID in the transaction ID field 605 of the node 602 is transaction B, the CPU 401 determines that a node corresponding to transaction B exists.

The CPU 401, for example, determines whether the transaction ID in the transaction ID field 605 of the node indicated by the subsequent node field 604 of the current node and the transaction ID of the acquired packet are identical. The current node is the node 603 and the subsequent node field 604 of the current node indicates the node 601. Therefore, since the transaction ID in the transaction ID field 605 of the node 601 is transaction A and the CPU 401 determines the transaction ID of the acquired packet is not identical, the acquired packet is detected as a packet that has been transmitted in a sequence that differs from the specified sequence.

The transaction ID of a skipped packet is identified by the transaction ID in the transaction ID field 605 of the node indicated by the subsequent node field 604 of the current node. Therefore, a packet of transaction A is a skipped packet and the CPU 401 computes skip_ok(A) of expression (3) above. First, the CPU 401, for example, computes built_in(A) of expression (2) above. Since (Tremain-Tmargin) is greater than Tsend(A), built_in(A) is 0 (false).

Subsequently, the CPU 401 computes plugin_1(A). The CPU 401, for example, accesses the transmission source device 101 and acquires information indicating whether a packet of transaction A is under preparation for transmission. Here, it is assumed that that the information acquired indicates that preparation for transmission is in progress. Therefore, the CPU 401 regards plugin_1(A) of expression (3) to be 1 and skip_ok(A) of expression (3) becomes 1 (true). The CPU 401 determines that at the fourth transmission, the skipping of the packet of transaction A is permissible.

The CPU 401, for example, outputs information indicating that a packet of transaction A is permitted fourth and has been skipped. The form of output, for example, may be display at the display 408, print out at the printer 413, and transmission to an external apparatus through the I/F 409. Further, output may be as storage to a storage unit such as the RAM 403, magnetic disk 405, and optical disk 407.

Subsequently, the CPU 401 sets the node indicated by the subsequent node field 604 of the current node as the current node in the list 800. Here, the current node becomes the node 601. The CPU 401, for example, determines whether the transaction ID in the transaction ID field 605 of the node indicated by the subsequent node field 604 of the current node and the transaction ID of an acquired packet are identical. Here, since multiple packets may be skipped, processes are repeated until the transaction ID field 605 of the node indicated by the subsequent node field 604 of the current node and the transaction ID of the acquired packet are determined to be identical.

The subsequent node field 604 of the current node indicates the node 602 and the transaction represented by the node 602 is transaction B. Therefore, the CPU 401 determines the transaction ID of the acquired packet to be identical. Upon determining the transactions to be identical, the CPU 401 sets the node indicated by the subsequent node field 604 of the current node as the current node in the list 800, the current node becoming the node 602.

According to the processes described, transmission according to the specified sequence is determined using the list 800. Next, an example when a transmitted packet is the last packet of a transaction will be described.

Figure 10:
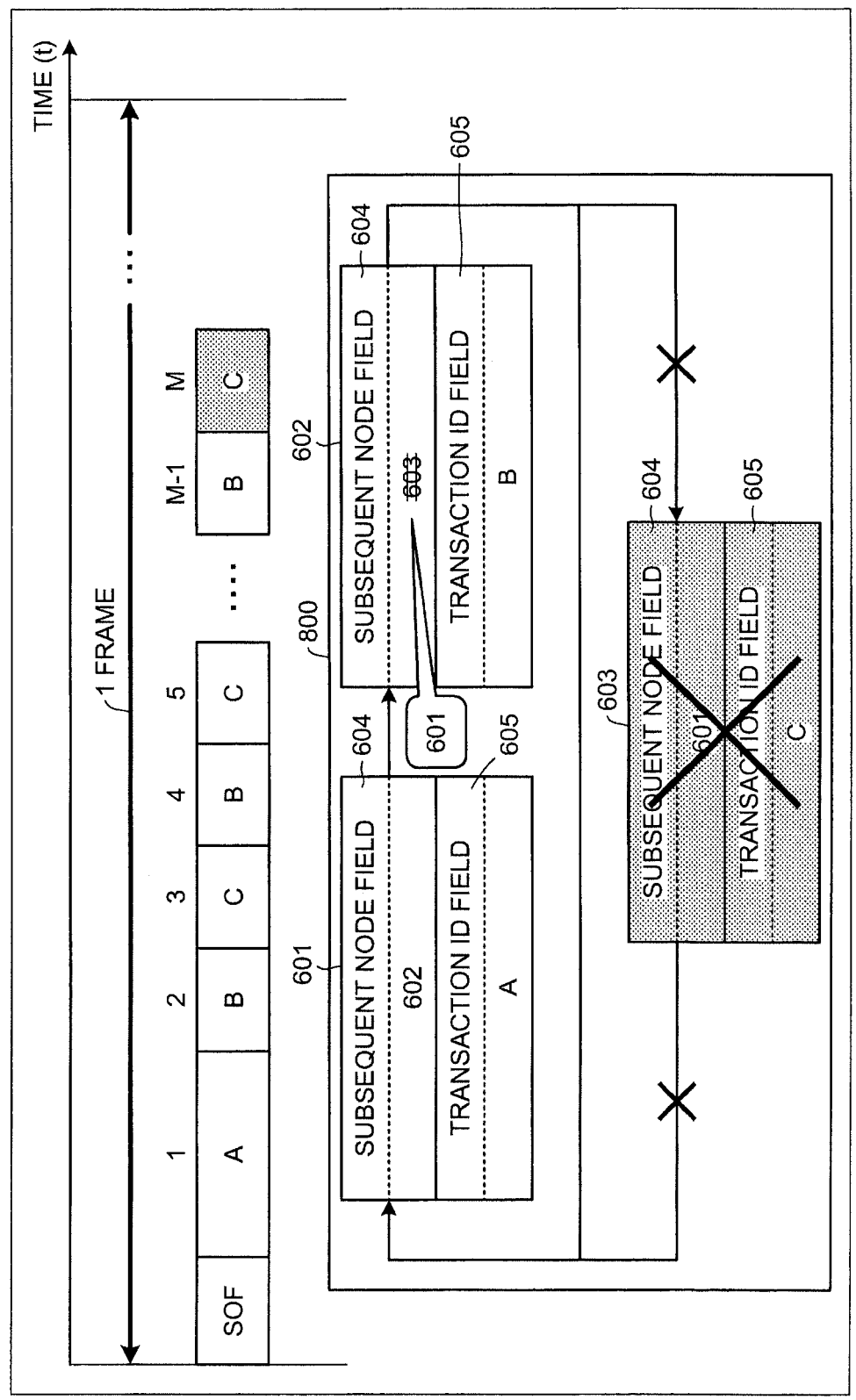
FIG. 10 is a diagram depicting an example of node deletion.

FIG. 10 is a diagram depicting an example of node deletion. The CPU 401, for example, after determining whether an acquired packet has been transmitted according to the specified sequence, subsequently determines whether the acquired packet is the last packet of a transaction. In the present embodiment, it is assumed that a packet of transaction C transmitted m-th is the last packet of transaction C. As conventionally known, a packet includes a flag indicating whether the packet is the last packet of a transaction.

The CPU 401, for example, determines that the acquired packet is the last packet of transaction C. Here, the current node is the node 602 and the node corresponding to transaction C is the node 603. First, the CPU 401, for example, sets the subsequent node field 604 of the node 602 to indicate the node 601 (indicated in the subsequent node field 604 of the node 603), and deletes the node 603. As a result of the deletion, the list 800 becomes identical to the list 700. The CPU 401, for example, leaves the node 602 as the current node and acquires the packet transmitted m+1-th Until the end of one frame, the monitoring apparatus 100 monitors packets transmitted from the transmission source device 101. Next, processes executed by the receiving unit 501 and the conditional expression generating unit 502 will be described in detail with reference to FIG. 11.

Figure 11:
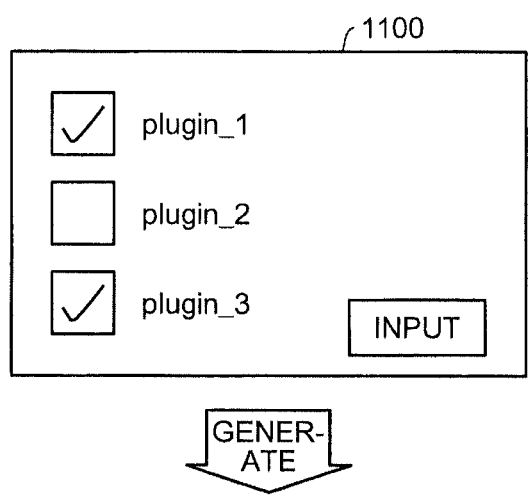
FIG. 11 is a diagram depicting an example of generation of a conditional expression for a constraint.

FIG. 11 is a diagram depicting an example of generation of a conditional expression for a constraint. Here, constraints based on design specifications related to the transmission source device 101 include plugin__1 to plugin__3. On an input screen 1100, plugin__1 to plugin__3 respectively have check-boxes into which the user inserts a check to select a constraint based on design specifications. In the input screen 1100, plugin__1 and plugin__3 have been selected.

The constraints selected from among multiple constraints based on design specifications are entered through a pushing of an entry button by the user and the CPU 401 receives the input of the selected constraints. The CPU 401, for example, generates a conditional expression related to the constraints by respectively connecting the built_in constraint based on communication protocol, plugin__1, and plugin__3 by a "∨". Thus, if the user preliminarily prepares multiple plug-ins, a plug-in can be selected in line with design specifications related to the transmission source device 101.

Figure 12:
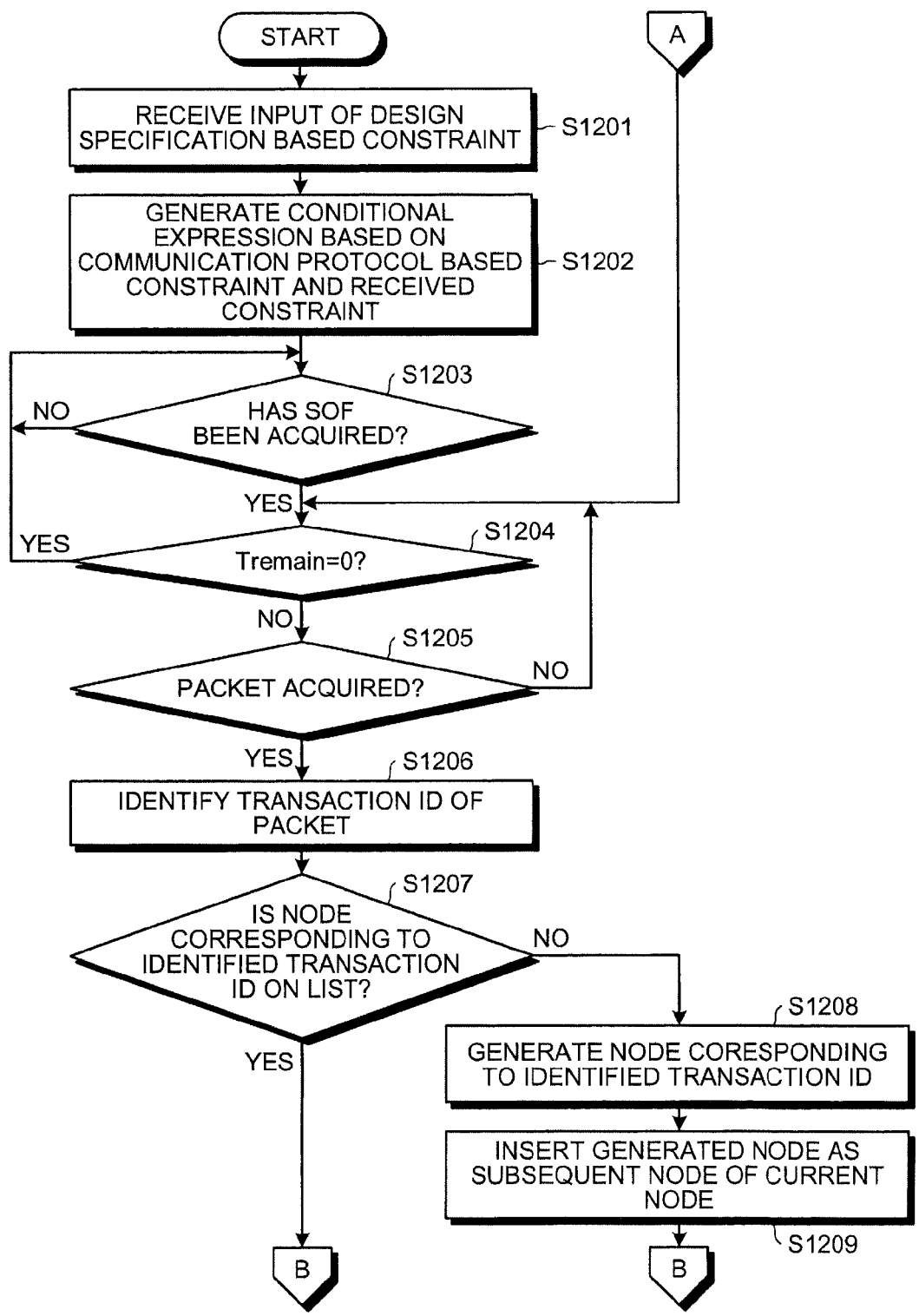
FIGS. 12 and 13 are flowcharts of an example of a monitoring process procedure executed by the monitoring apparatus.
Figure 13:
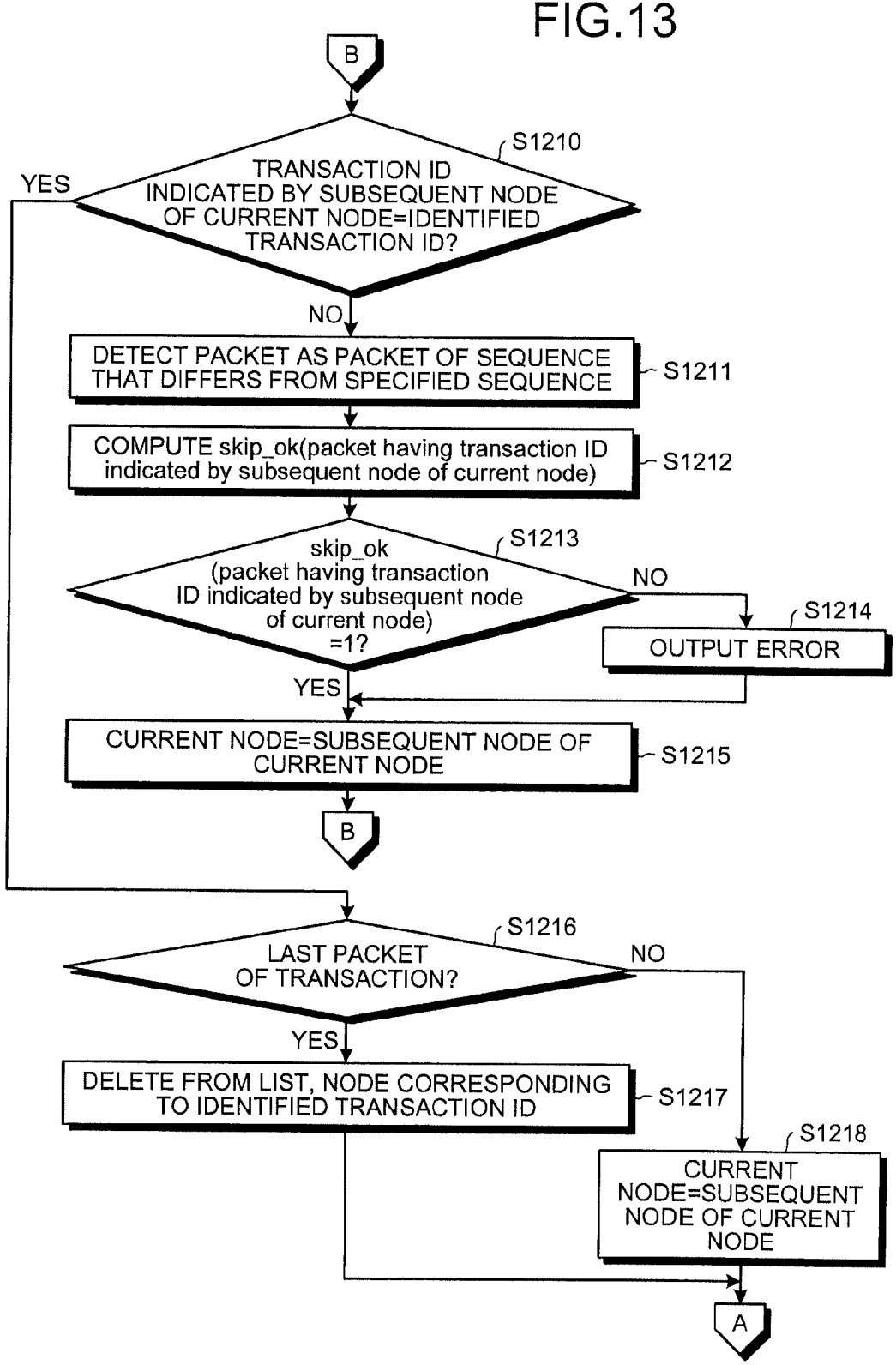

FIGS. 12 and 13 are flowcharts of an example of a monitoring process procedure executed by the monitoring apparatus 100. The flowcharts depicted in FIGS. 12 and 13 depict an example of processes for one frame. First, the monitoring apparatus 100 receives input of a constraint selected from among multiple constraints based on design specifications (step S1201) and generates a conditional expression based on the communication protocol based constraint and the received constraint (step S1202). The monitoring apparatus 100 determines whether an SOF has been received (step S1203). If it is determined that an SOF has not been received (step S1203: NO), flow returns to step S1203.

On the other hand, if the monitoring apparatus 100 determines that an SOF has been received (step S1203: YES), the monitoring apparatus 100 determines whether Tremain=0 (step S1204). If the monitoring apparatus 100 determines that Tremain=0 is true (step S1204: YES), flow returns to step S1203. On the other hand, if the monitoring apparatus 100 determines that Tremain=0 is false (step S1204: NO), it is determined whether a packet has been received (step S1205). If the monitoring apparatus 100 determines that a packet has not been received (step S1205: NO), flow returns to step S1204. On the other hand, if the monitoring apparatus 100 determines that a packet has been received (step S1205: YES), the monitoring apparatus 100 identifies the transaction ID of the acquired packet (step S1206) and determines whether a node corresponding to the identified transaction ID is on a list indicating the specified sequence (step S1207).

If the monitoring apparatus 100 determines that a node corresponding to the identified transaction ID is not on the list (step S1207: NO), the monitoring apparatus 100 generates a node that corresponds to the identified transaction ID (step S1208). Subsequently, the monitoring apparatus 100 inserts the generated node as the subsequent node of the current node (step S1209), and flow proceeds to step S1210.

On the other hand, if the monitoring apparatus 100 determines that a node corresponding to the identified transaction ID is on the list (step S1207: YES), the monitoring apparatus 100 determines whether the transaction_ID indicated by the subsequent node of the current node=the identified transaction ID (step S1210). If the monitoring apparatus 100 determines that the transaction ID indicated by the subsequent node of the current node=the identified transaction ID is not true (step S1210: NO), the monitoring apparatus 100 detects the acquired packet as a packet of a sequence that differs from the specified sequence (step S1211).

The monitoring apparatus computes skip_ok (packet having transaction ID indicated by subsequent node of current node) (step S1212) and determines whether skip_ok (packet having transaction ID indicated by subsequent node of current node)=1 (step S1213). Here, the packet having the transaction ID indicated by the subsequent node of the current node is a skipped packet.

If the monitoring apparatus 100 determines that skip_ok (packet having transaction ID indicated by subsequent node of current node)=1 is not true (step S1213: NO), the monitoring apparatus outputs an error (step S1214), and flow proceeds to step S1215. On the other hand, if the monitoring apparatus 100 determines that skip_ok (packet having transaction ID indicated by subsequent node of current node)=1 is true (step S1213: YES), the monitoring apparatus 100 sets the current node=the subsequent node of the current node (step S1215), and flow returns to step S1210.

On the other hand, if the monitoring apparatus 100 determines that the transaction ID indicated by the subsequent node of the current node=the identified transaction ID is true (step S1210: YES), the monitoring apparatus 100 determines whether the acquired packet is the last packet of the transaction (step S1216). If the monitoring apparatus 100 determines that the acquired packet is the last packet of the transaction (step S1216: YES), the monitoring apparatus 100 deletes the node corresponding to the transaction ID from the list (step S1217), and flow proceeds to step S1204.

If the monitoring apparatus 100 determines that the acquired packet is not the last packet of the transaction (step S1216: NO), the monitoring apparatus 100 sets the current node=the subsequent node of the current node (step S1218), and flow proceeds to step S1204. Further, in the present embodiment, although the monitoring apparatus 100 generated a list indicating the specified sequence, if the transmission source device 101 generates a list indicating the specified sequence, the monitoring apparatus 100 may acquire and use the list.

As described, according to the monitoring program, the monitoring apparatus, and the monitoring method, a packet transmitted in a sequence that differs from a specified sequence is detected and it is determined whether the sequence that differs from the specified sequence is permissible. Consequently, since among errors arising in the operation of a transmission source device, the validity of behavior that is not actually an error is confirmed and false errors are identified, thereby facilitating verification work efficiency.

Further, specified constraints are constraints based on communication protocol and since false errors resulting from compliance with communication protocol are identified from among errors arising in the operation of the transmission source device, verification work efficiency is facilitated.

Additionally, specified constraints are constraints based on communication protocol and constraints based on design specifications related to the transmission source device, and false errors resulting from compliance with communication protocol or design specifications are identified from among errors arising in the operation of the transmission source device. Consequently, verification work efficiency is facilitated.

Furthermore, constraints desired for verification are selected by the user and a constraint related conditional expression is generated for the specified constraints, i.e., the selected constraint(s) and the constraint based on communication protocol. Thus, even if the design specifications of the transmission source device are modified, by mere constraint selection, constraints can be added, substituted, etc. according to the design specifications of the transmission source device, thereby improving verification flexibility.

The monitoring method described in the present embodiment may be implemented by executing a prepared program on a computer such as a personal computer and a workstation. The program is stored on a non-transitory, computer-readable recording medium such as a hard disk, a flexible disk, a CD-ROM, an MO, and a DVD, read out from the non-transitory recording medium, and executed by the computer.

The present monitoring program, monitoring apparatus, and monitoring method effect verification work efficiency by confirming the validity of behavior that is not actually an error, among errors arising in the operation of a transmission source device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable recording medium storing therein a monitoring program that causes a computer monitoring data transmission from a transmission source device to a transmission destination device to execute a process comprising:

detecting data transmitted in a sequence that differs from a specified sequence;

determining whether the sequence that differs is permissible by at least one constraint included in a specified constraint, if data transmitted at the sequence that differs is detected at the detecting, the specified constraint including a communication protocol constraint based on communication protocol between the transmission source device and the transmission destination device and including a design specifications constraint based on design specifications related to the transmission source device;

receiving input of a constraint selected from among a plurality of constraints based on the design specifications;

generating a conditional expression related to the specified constraint, the specified constraint including the constraint received at the receiving and the communication protocol constraint; and outputting a determination result obtained at the determining, wherein the determining includes determining whether the sequence that differs is permissible based on the conditional expression generated at the generating, if data transmitted in the sequence that differs is detected at the detecting.

2. A monitoring apparatus that monitors data transmission from a transmission source device to a transmission destination device, the monitoring apparatus comprising:

a processor that detects data transmitted in a sequence that differs from a specified sequence;

determines whether the sequence that differs is permissible by at least one constraint included in a specified constraint, if data transmitted at the sequence that differs is detected, the specified constraint including a communication protocol constraint based on communication protocol between the transmission source device and the transmission destination device and including a design specifications constraint based on design specifications related to the transmission source device;

receives input of a constraint selected from among a plurality of constraints based on the design specifications;

generates a conditional expression related to the specified constraint, the specified constraint including the received constraint and the communication protocol constraint; and outputs a result of the determination, wherein the processor determines whether the sequence that differs is permissible based on the generated conditional expression, if data transmitted in the sequence that differs is detected.

3. A monitoring method for a computer that monitors data transmission from a transmission source device to a transmission destination device, the monitoring method causing the computer to execute a process comprising:

detecting data transmitted in a sequence that differs from a specified sequence;

determining whether the sequence that differs is permissible by at least one constraint included in a specified constraint, if data transmitted at the sequence that differs is detected at the detecting, the specified constraint including a communication protocol constraint based on communication protocol between the transmission source device and the transmission destination device and including a design specifications constraint based on design specifications related to the transmission source device;

receiving input of a constraint selected from among a plurality of constraints based on the design specifications;

generating a conditional expression related to the specified constraint, the specified constraint including the constraint received at the receiving and the communication protocol constraint; and outputting a determination result obtained at the determining, wherein the determining includes determining whether the sequence that differs is permissible based on the conditional expression generated at the generating, if data transmitted in the sequence that differs is detected at the detecting.

* * * * *